July 26, 1966

C. BRAKHAGE 3,262,505

TRACTOR-MOUNTED FOLDING DRAG HITCH

Filed Aug. 13, 1963

INVENTOR.
CHARLES BRAKHAGE
BY
Merchant, Merchant + Gould
ATTORNEYS

INVENTOR.
CHARLES BRAKHAGE
BY
Merchant, Merchant + Gould
ATTORNEYS

INVENTOR.
CHARLES BRAKHAGE
BY
Merchant, Merchant & Gould
ATTORNEYS

United States Patent Office 3,262,505
Patented July 26, 1966

3,262,505
TRACTOR-MOUNTED FOLDING DRAG HITCH
Charles Brakhage, Murdock, Minn.
Filed Aug. 13, 1963, Ser. No. 301,772
4 Claims. (Cl. 172—456)

This invention relates generally to agricultural machinery and tools, and more particularly it relates to a folding drag hitch for use in combination with tractors.

This invention generally comprises a central frame section and a pair of side frame sections pivotally connected on opposite sides of the central frame section, and includes novel means for moving the side frame sections between a ground working position in general transverse alignment with the central frame section and forwardly extending folded positions on opposite sides of the tractor.

This invention is particularly adapted for use in supporting ground-working agricultural implements of substantially greater transverse dimension than the width of the tractor, and one type of such an implement is a harrow, wherein several sections thereof are pivotally connected in side-by-side relationship so as to greatly increase the ground coverage of the implement with each pass over the ground made by the tractor or other towing vehicle.

An important object and advantage of the present invention is the provision of simplified and efficient means for imparting swinging movements of the side frame sections of said drag hitch about their pivotal connections to the central frame section between lower positions wherein the side frame sections are generally coplanar with the central frame section and inoperative positions wherein the side frame sections are disposed in generally forwardly projecting relationship on opposite sides of the tractor.

Another important object of the present invention is the provision of means for imparting rotary movement to the rockshafts of the frame sections which support the rearwardly extending implement sections between a first position wherein the implements carried by the rockshafts are disposed in a lower ground-working condition and a second position wherein the implements are disposed in generally angularly upwardly extending inoperative conditions, and which means is operative independent of the beforesaid means for moving the side frame sections between their previously-noted lower positions on opposite sides of the central frame section and their inoperative positions.

A further object of the present invention resides in the provision of a folding drag hitch which includes shifting means operative to cause generally simultaneous movement of the side frame sections relative to the central frame section and movement of the implement-supporting rockshafts, and which shifting means is also operative in another position to permit movement of the implement-supporting rockshafts without imparting the above-noted folding movement to the side frame sections.

Still further objects of the present invention reside in the provision of a folding drag hitch for use in combination with a tractor which may be easily installed and dismounted onto a tractor, which may be relatively economically manufactured, and which is highly efficient in providing satisfactory performance of its objects and purposes.

The foregoing and other objects and advantages of the present invention will become apparent from a consideration of the following detailed specification, appended claims and attached drawings.

Referring to the drawings, wherein like reference characters indicate like parts or elements throughout the several views:

FIG. 8 is an enlarged view in vertical section taken on the line 8—8 of FIG. 7, some parts being broken away.

Figure 1:
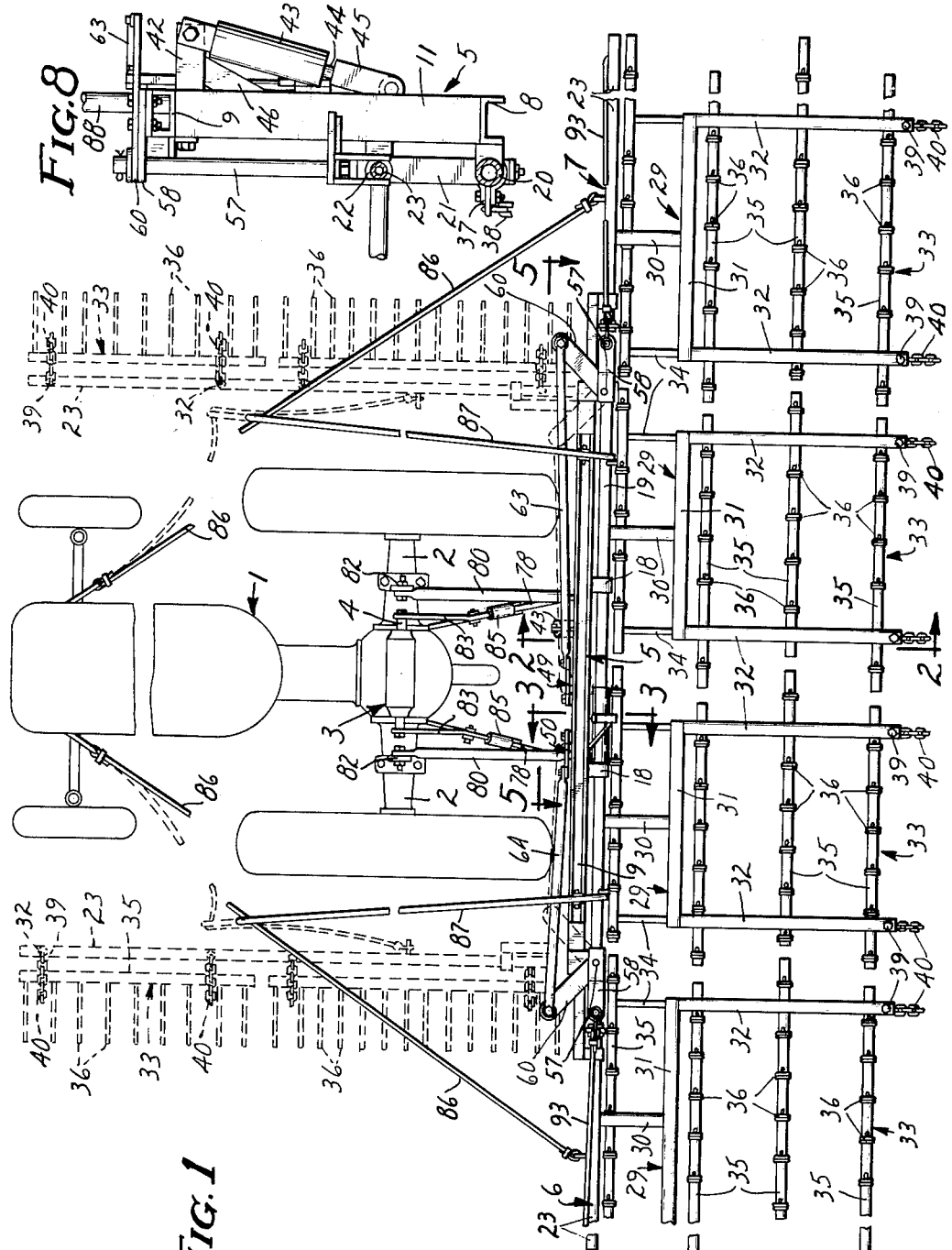
FIG. 1 is a view in top plan, some parts being broken away, and showing the folded inoperative position of the side frame sections by dotted lines.

Referring to the drawings, and particularly FIG. 1 thereof, a farm tractor is represented by the reference numeral 1, the same including a rear axle 2, and a conventional power lift, represented generally by the reference numeral 3, the power lift 3 including an upper transversely disposed shaft 4 and a lower transversely disposed shaft, not shown. The present invention comprises an improved folding drag hitch for use in combination or connection with the tractor 1, as will be fully described hereinafter.

Figure 5:
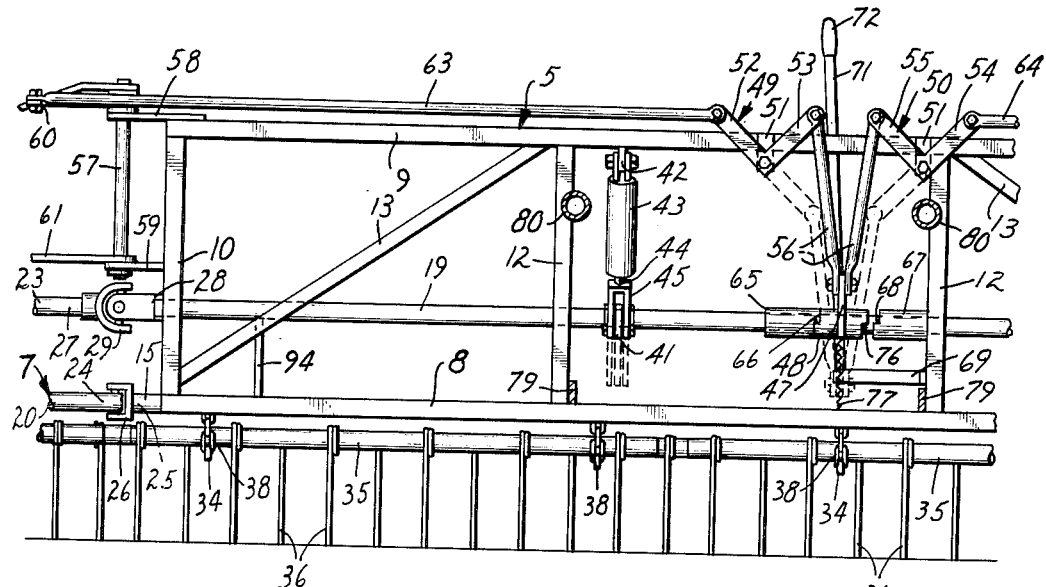
FIG. 5 is a view in vertical section taken on the line 5—5 of FIG. 1, and showing alternative positions of some parts by dotted lines.

The folding drag hitch comprises a central frame section, represented generally by the reference numeral 5, and a pair of side frame sections, represented generally by the reference numerals 6, 7, respectively. The side frame sections 6, 7 are disposed on opposite generally side-by-side alignment in operating position each one on a different side of the central frame section 5, as shown particularly in FIG. 1. Referring to FIG. 5, the central frame section 5 is rigidly constructed from a lower channel member 8, an upper channel member 9, opposite end channel members 10, 11, intermediate vertical struts 12, and upwardly and inwardly extending angle braces 13, the foregoing all being rigidly secured together, as by welding.

Figure 2:
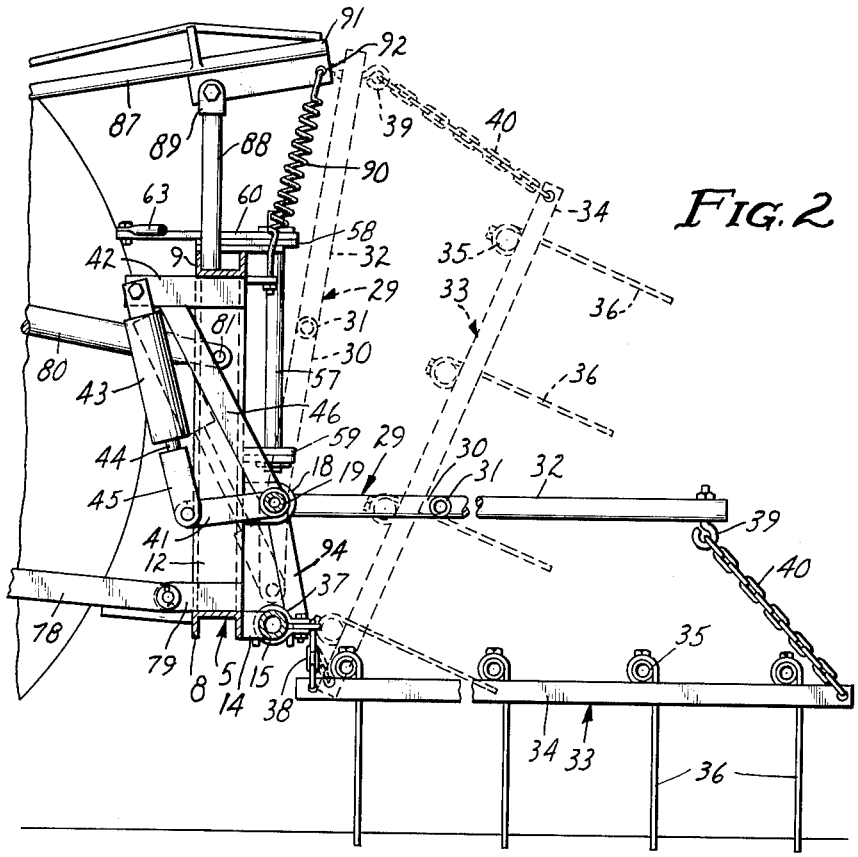
FIG. 2 is an enlarged view in vertical section taken on the line 2—2 of FIG. 1, and showing the upwardly extending inoperative condition of the implement sections and supporting hitch elements by dotted lines.
Figure 3:
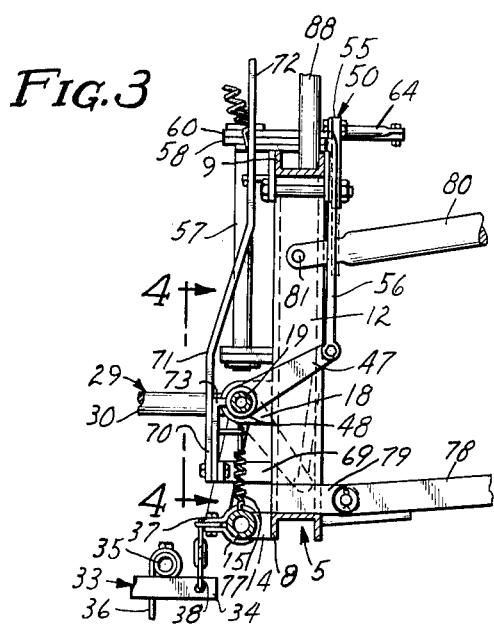
FIG. 3 is an enlarged view in vertical section taken on the line 3—3 of FIG. 1.
Figure 4:
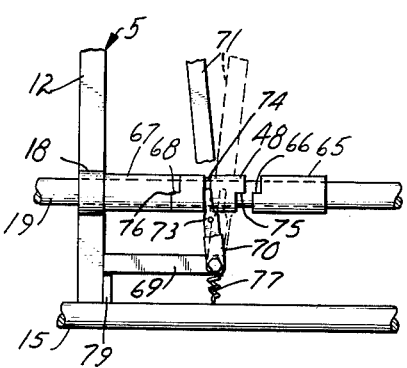
FIG. 4 is a fragmentary sectional view taken on the line 4—4 of FIG. 3, some parts being broken away.

Referring to FIGS. 2 and 3, it will be noted that the central frame section 5 includes a plurality of rearwardly projecting lugs 14 which are secured at their forward end portions to the lower channel member 8. An elongated generally horizontally extending lower shaft 15 is rigidly secured to the rearward end portions of the lug 14. A plurality of bearing lugs 18 are provided, some of the same being rigidly secured to the vertical struts 12 of the central frame section 5 and others thereof being rigidly secured to the end channel members 10, 11. An elongated generally horizontally disposed rockshaft 19 is journalled within the axially aligned bearing lugs 18 in general parallelism with the lower shaft 15, as shown particularly in FIGS. 2 and 7. The rockshaft 19 is adapted for the support of implement sections, as will be particularly described hereinafter.

Figure 7:
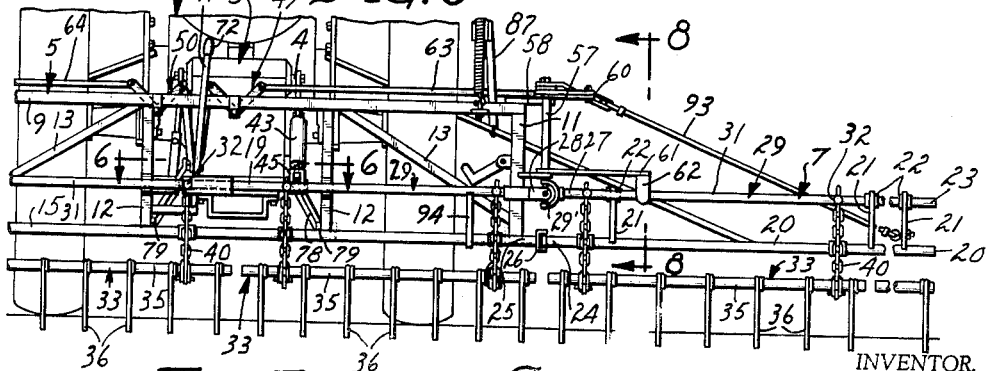
FIG. 7 is a fragmentary view in rear elevation.

The side frame sections 6, 7 are generally identical in construction, and therefore the following description will be applicable to both thereof. Each of the side frame sections 6, 7 comprises an elongated generally horizontally disposed lower shaft 20 having a plurality of transversely spaced rigidly secured support bars 21, the upper end portions of which define axially aligned bearing collars 22. Each of the side frame sections 6, 7 further comprises an elongated generally horizontally extending rockshaft 23 journalled within the bearing collars 22 of the upstanding support bars 21. Referring to FIGS. 5 and 7, it will be noted that the inner end portions 24 of the lower shaft 20 of the side frame sections 6, 7 are pivotally connected to the outer end portions 25 of the lower shaft 15 of the central frame section 5 by means of hinge connectors 26 for pivotal movements about vertically spaced generally parallel axes. The inner end portions 27 of the rockshafts of the side frame sections 6, 7 are also pivotally connected to the outer end portions 28 of the rockshaft 19 of the central frame section 5 by means of universal joints 29' for universal pivotal movements in cooperation with the pivotal swinging movements of the hinge connectors 26 previously noted.

In order to provide means for the support of implement sections on the rockshafts 19, 23, and in accordance with the present invention, a plurality of laterally spaced implement supporting frames 29 are rigidly secured at their forward end portions to the rockshafts 19, 23 so as to project generally rearwardly and outwardly therefrom, in the manner shown particularly in FIGS. 1 and 2. As shown particularly in FIG. 1, the implement support frames 29 each include a mounting bar 30, a transverse cross bar 31 and a pair of side bars 32 rigidly secured at the opposite ends of the cross bar 31. It will be appreciated that the structure of the present invention is designed for satisfactory use in combination with generally any type of dragging implement for working the ground, but for purposes of illustration, the drag hitch described herein is shown with generally conventional transversely spaced harrow sections 33. The harrow sections 33 may be of any conventional design and normally include longitudinal support bars 34 and transverse support bars 35 secured thereto with a plurality of tines 36 depending therefrom. The harrow sections 33 are secured at their forward end portions to the lower shafts 15, 20 of the frame sections 5-7 by means of a plurailty of clamps 37 and cooperating chain connectors 38, as shown particularly in FIG. 2. The rear portions of the harrow sections 33 are secured to the outer end portions of the side bars 32 of the implement supporting frames 29 by means of a plurality of I-bolts 39 and chain links 40.

According to present practice, actuating means is provided in connection with the rockshaft 19 of the central frame section 5 for providing rotary or rocking movement of the rockshafts 19, 23, about their axes, between a first position wherein the implement sections 33 are disposed in a lower ground-working condition as shown by full lines in FIG. 2, and a second position wherein the harrow sections 33 are disposed in a generally angularly upwardly and rearwardly extending inoperative condition, shown by dotted lines in FIG. 2. The above-noted actuating means comprises a radially extending crank arm 41 rigidly secured to the rockshaft 19 of the central frame section 5. A mounting bar 42 is rigidly secured beneath the upper channel member 9 of the central frame section 5 and extends forwardly therefrom, as shown particularly in FIG. 2, and a fluid pressure operated cylinder 43 is pivotally connected to the forward end portion of the mounting bar 42. An extensible and retractable piston rod 44 has one end portion received within and cooperating with the fluid pressure operated cylinder 43, and the other end portion of the piston rod 44 is pivotally secured by means of a clevis connector 45 to the outer end portion of the crank arm 41. An angularly extending inverted Y-shaped brace rod 46 is interposed between the mounting bar 42 and the rockshaft 19 of the central frame section 5. Referring to FIG. 2, it will be noted that upon extension of the piston rod 44 of the fluid pressure operated cylinder 43, angular movement will be imparted to the crank arm 41 resulting in rotary or rocking movement of the rockshafts 19, 23 so as to move the implement sections 33 carried by the implement supporting frames 29 from their ground-working condition shown by full lines in FIG. 2 to an upwardly extending inoperative condition shown by dotted lines in FIG. 2.

Figure 6:
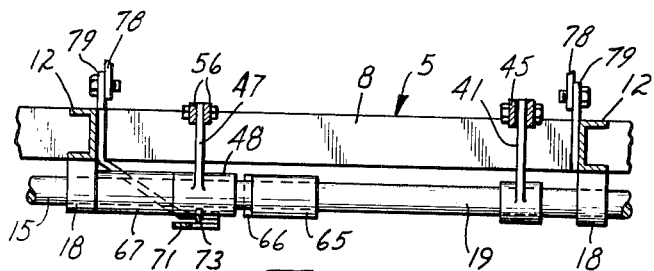
FIG. 6 is an enlarged sectional view taken on the line 6—6 of FIG. 7, some portions being broken away.

An important feature of the present invention resides in the provision of efficient means for causing swinging movements of the side frame sections 6, 7 about their pivotal connections to the opposite end portions of the central frame section 5 between lower positions wherein the side frame sections 6, 7 are generally coplanar with and are positioned on opposite sides of the central frame section 5 (as shown by full lines in FIG. 1), and inoperative positions wherein the side frame sections 6, 7 are disposed in generally forwardly projecting relationship on opposite sides of the tractor 1 (as shown by dotted lines in FIG. 1). To accomplish this swinging movement of the side frame sections 6, 7, relatively simple linkage means responsive to the above-noted actuating means imparting rotation to the rockshafts 19, 23, is provided in accordance with the present invention. As shown particularly in FIGS. 5 and 6, a radially projecting second crank arm 47 is connected by means of a sleeve 48 to the rockshaft 19 of the central frame section 5. As will be more fully described hereinafter, the sleeve 48 is movable to a position where it imparts movement to the second crank arm 47 in unison with rotary movement of the rockshaft 19. As shown particularly in FIG. 5, a pair of bell cranks 49, 50 are pivotally mounted on the upper channel member 9 of the central frame section 5 about spaced generally parallel axes by means of a pair of depending brackets 51. The bell crank 49 defines angularly disposed first and second arm portions 52, 53, and the bell crank 50 also defines angularly disposed first and second arm portions 54, 55. The second arm portion 53 of the bell crank 49 and the second arm portion 55 of the bell crank 50 are pivotally connected by means of a pair of generally vertical links 56 to the outer end portion of the second crank arm 47.

The present invention further comprises a pair of elongated generally parallel vertical rockshafts, each represented generally by the reference numeral 57, and each one of which is pivotally mounted by means of laterally extending upper and lower brackets 58, 59 to a different one of the opposite end portions of the central frame section 5 in spaced relation to the end channel members 10, 11 thereof. Each of the vertical rockshafts 57 is provided with a radially extending upper arm 60 and a radially projecting lower arm 61. As shown particularly in FIGS. 5 and 8, the outer end portions of the lower arms 61 of the vertical rockshafts 57 are provided with spaced depending lugs 62 which engage the rockshafts 23 of the side frame sections 6, 7. As shown particularly in FIGS. 1 and 5, the outer end portions of the upper arms 60 of the vertical rockshafts 57 are pivotally connected by means of elongated horizontal link elements 63, 64, respectively, to the outer end portions of the first arm portions 52, 54 of the bell cranks 49, 50. With this arrangement, the rotary movement of the rockshaft 19 of the central frame section is transferred through the angular movement of the second crank arm 47 and the resulting movement of the connecting elements to rotary movement of the vertical rockshafts 57 whereby to move the side frame sections 6, 7 between their above-noted lower positions shown by full lines in FIG. 1 and their inoperative positions shown by dotted lines in FIG. 1. The positions of the bell cranks 49, 50, the vertical links 56 and the second crank arm 47 which correspond to the inoperative positions of the side frame sections 6, 7 are shown by dotted lines in FIG. 5.

An important feature of the present invention is the provision of shifting means connecting the second crank arm 47 to the rockshaft 19 of the central from section 5 which is operative to provide at least partially simultaneous movement of the side frame sections 6, 7 between their lower positions and their forwardly projecting inoperative positions and movement of the implement supporting frame 29 between lower ground-working conditions of the implement sections 33 as shown by full lines in FIG. 2 and the upwardly extending inoperative conditions thereof shown by dotted lines in FIG. 2. The above-noted shifting means is also operative in another position thereof to disconnect the above-noted generally simultaneous movements whereby upon rotation of the rockshaft 19 of the central frame section 5, only the movement of the implement supporting frames 29 between the ground-working condition of the implement sections 33 and the upwardly extending inoperative condition is imparted and movement is not imparted to the second crank arm 47.

This shifting means comprises means for axially shifting the sleeve 48 which mounts or connects the second crank arm 47 to the rockshaft 19. More particularly, and referring to FIGS. 5 and 6, the shifting means noted above comprises an abutment sleeve 65 rigidly secured on the rockshaft 19 and having an offset end portion 66. Also, a stop sleeve 67 having an offset end portion 68 is rigidly secured to the adjacent vertical strut 12 of the central frame section 5, but is not secured to the rockshaft 19 so as to permit relative rotation therebetween.

An angle bracket 69 is rigidly secured to the vertical strut 12 of the central frame section 5 and a laterally inwardly projecting end portion thereof pivotally mounts the lower end portion 70 of an upstanding shift lever 71. A tooth 73 projects forwardly from the shift lever 71 and is received within a vertical slot 74 defined in the sleeve 48 of the second crank arm 47, and the shift lever 71 defines a handle portion 72 for moving the tooth 73 and the sleeve 48 to an engaged condition wherein an upwardly open offset portion 75 of the sleeve 48 engages the offset end portion 66 of the abutment sleeve 65 so as to impart angular movement to the second crank arm 47 upon rotary movement of the rockshaft 19, as shown particularly in FIG. 5 of the drawings. The alternate position of the sleeve 48 is shown in FIG. 5, wherein a downwardly open offset portion 76 thereof engages the offset end portion 68 of the stop sleeve 67, whereby the second crank arm 47 and the related linkage is maintained at the position represented by full lines in FIG. 5 irrespective of the rotary movement of the rockshaft 19. A tension spring 77 is secured between the tooth 73 and the adjacent lug 14, as shown particularly in FIG. 3, for maintaining the tooth 73 and the sleeve 48 in either one of the desired extreme positions.

The novel folding drag hitch described herein is connected to the tractor 1 by means of a pair of laterally spaced generally horizontally extending elongated lower links 78 which are pivotally connected at their rearward ends to the lower channel member 8 of the central frame section 5 by means of a pair of bearing lugs 79, as shown particularly in FIGS. 2 and 3. The lower links 78 are also pivotally connected at their forward end portion to the opposite ends of the lower rockshaft, not shown, defined by the power lift 3 of the tractor 1. A pair of laterally spaced elongated upper links 80 have their rearward end portions pivotally secured, as at 81, to the vertical struts 12 of the central frame section 5. The upper links 80 are also pivotally secured at their forward end portion to the fender brackets 72 of the tractor 1. A pair of transversely spaced generally rearwardly projecting lifting arms 83 are rigidly secured at their forward end portions to the opposite ends of the upper rockshaft 4 of the tractor power lift 3. A pair of transversely spaced lifting links 85 cooperate with the lifting arms 83 and are each one pivotally connected at its upper end portion to a different one of the rearward ends of the lifting arms 83. The lifting links 85 also have their lower end portions pivotally secured to intermediate portions of the lower links, 78.

It is noted that the above-described connecting mechanism is so arranged that when the lifting arms 83 are moved in an angular direction by actuation of the upper rockshaft 4 of the tractor power lift 3, the central frame section 5 is moved in a generally vertical direction. Also, the above-noted connection of the forward end portions of the lower link 78 to the lower rockshaft, not shown, of the tractor power lift 3 provides means for adjusting the relative positions of the lower links 78 and the upper links 80 so as to provide means for leveling the folding drag hitch described herein.

Referring to FIGS. 1 and 2, it is noted that when the side frame sections 6, 7 are in their lower positions corresponding to ground-working conditions of the implement sections 33, the side frame sections 6, 7 are pulled by steel cables 86 connected to the forward portion of the tractor 1. In order to provide means for supporting the cables 86 when the side frame sections 6, 7 are in their folded inoperative positions, shown by dotted lines in FIG. 1, adjacent the opposite sides of the tractor 1, a pair of forwardly projecting elongated support arms 87 are pivotally secured in laterally spaced relation to the upper channel member 9 of the central frame section 5 by means of a pair of upstanding pedestals 88 equipped with U-brackets 89 at their upper end portions. An upwardly directed bias is applied to the forward end portions of the support arms 87 by means of a pair of coil springs 90 secured at their upper ends to the rearward ends 91 of the support arms 87. The lower ends of the coil springs 90 are secured, as at 92, to the upper channel member 9 of the central frame section 5, as shown particularly in FIG. 2.

The side frame sections 6, 7 are supported in their lower positions by a pair of supporting cables 93 one each secured between the upper end portions of the vertical rockshafts 57 and the outermost support bars 21, as shown particularly in FIG. 7. Also a pair of stop arms 94 are secured to the rockshaft 19 and are so positioned to limit downward movement of the implement supporting frames 29 to the full line position shown in FIG. 2.

This invention has been thoroughly tested and found to be completely satisfactory for the accomplishment of the above objects; and while I have shown and described above a perferred embodiment thereof in which the principles of the present invention have been incorporated, I wish it to be specifically understood that the same may be modified without departure from the scope and spirit of the appended claims.

What is claimed is:

1. A folding drag hitch for use in combination with a tractor, said hitch comprising:
    (a) a central frame section having an elongated generally horizontal rockshaft for supporting an implement,
    (b) a pair of side frame sections each having an elongated generally horizontal rockshaft for supporting implements, said side frame sections being pivotally connected in opposite generally side-by-side alignment in operating position with each one on a different side of said central frame section,
    (c) a pair of universal joints connecting the opposite outer ends of the rockshaft of the central frame section to the inner ends of the rockshafts of the side frame sections for universal cooperative rocking movements,
    (d) actuating means connected to the rockshaft of said central frame section for rotary movement of said rockshafts between a first position wherein the implements carried thereby are disposed in a lower ground-working condition and a second position wherein said implements are disposed in a generally angularly upwardly extending inoperative condition, said actuating means comprising:
        (1) a fluid pressure operated cylinder secured to said central frame section,
        (2) a radially extending crank arm secured to the rockshaft of said central frame section, and
        (3) an extensible and retractable piston rod cooperating with said cylinder and secured to said crank arm, and
    (e) linkage means connected to each of the side frame sections and responsive to said actuating means for causing swinging movements of said side frame sections about their pivotal connections to said central frame section between lower positions wherein said side frame sections are generally coplanar with said central frame section and inoperative positions wherein said side frame sections are disposed in generally forwardly projecting relationship on opposite sides of the tractor.

2. A folding drag hitch for use in combination with a tractor, said hitch comprising:
(a) a central frame section having an elongated generally horizontal rockshaft for supporting an implement,
(b) a pair of side frame sections each having an elongated generally horizontal rockshaft for supporting implements, said side frame sections being pivotally connected in opposite generally side-by-side alignment in operating position with each one on a different side of said central frame section,
(c) a pair of universal joints connecting the opposite outer ends of the rockshaft of the central frame section to the inner ends of the rockshafts of the side frame sections for universal cooperative rocking movements,
(d) actuating means connected to the rockshaft of said central frame section for rotary movement of said rockshafts between a first position wherein the implements carried thereby are disposed in a lower ground-working condition and a second position wherein said implements are disposed in generally angularly upwardly extending inoperative conditions, said actuating means comprising:
  (1) a fluid pressure operated cylinder secured to said central frame section,
  (2) a radially extending crank arm secured to the rockshaft of said central frame section, and
  (3) an extensible and retractable piston rod cooperating with said cylinder and secured to said crank arm, and
(e) linkage means connected to each of the side frame sections and responsive to said actuating means for causing swinging movements of said side frame sections about their pivotal connections to said central frame section between lower positions wherein said side frame sections are generally coplanar with said central frame section and inoperative positions wherein said side frame sections are disposed in generally forwardly projecting relationship on opposite sides of the tractor, said linkage means comprising:
  (1) a pair of elongated generally parallel vertical rockshafts one each mounted at a different one of the opposite ends of said central frame section,
  (2) said vertical rockshafts each having radially projecting arms the outer end portions of which engage the rockshafts of said side frame sections,
  (3) a radially extending second crank arm secured to the rockshaft of said central frame section, and
  (4) link elements connected between the second crank arm of said central frame section and each of said vertical rockshafts for transferring rotary movement of the rockshaft of said central frame section into rotary movement of said vertical rockshafts.

3. A folding drag hitch for use in combination with a tractor, said hitch comprising:
(a) a central frame section having an elongated generally horizontal rockshaft for supporting an implement,
(b) a pair of side frame sections each having an elongated generally horizontal rockshaft for supporting implements, said side frame sections being pivotally connected in opposite generally side-by-side alignment in operating position with each one on a different side of said central frame section,
(c) a pair of universal joints connecting the opposite outer ends of the rockshaft of the central frame section to the inner ends of the rockshafts of the side frame sections for universal cooperative rocking movements,
(d) actuating means connected to the rockshaft of said central frame section for rotary movement of said rockshafts between a first position wherein the implements carried thereby are disposed in a lower ground-working condition and a second position wherein said implements are disposed in a generally angularly upwardly extending inoperative condition, said actuating means comprising:
  (1) a fluid pressure operated cylinder secured to said central frame section,
  (2) a radially extending crank arm secured to the rockshaft of said central frame section, and
  (3) an extensible and retractable piston rod cooperating with said cylinder and secured to said crank arm, and
(e) linkage means connected to each of the side frame sections and responsive to said actuating means for causing swinging movements of said side frame sections about their pivotal connections to said central frame section between lower positions wherein said side frame sections are generally coplanar with said central frame section and inoperative positions wherein said side frame sections are disposed in generally forwardly projecting relationship on opposite sides of the tractor, said linkage means comprising:
  (1) a pair of elongated generally parallel vertical rockshafts one each mounted at a different one of the opposite ends of said central frame section,
  (2) each of said vertical rockshafts having radially projecting upper and lower arms, the lower arm of each vertical rockshaft engaging the rockshaft of the adjacent side frame section,
  (3) a second crank arm connected to the rockshaft of said central frame section,
  (4) a pair of bell cranks pivotally connected to the central frame section about spaced generally parallel axes and having angularly disposed first and second arm portions, and
  (5) link elements connected between the first arm portions of said bell cranks and the second crank arm of said central frame section and other link elements connected between the second arm portions of said bell cranks and the upper arms of said vertical rockshafts.

4. The structure defined in claim 3 in further combination with shifting means connecting said second crank arm to the rockshaft of said central frame section and movable between an engaged condition causing connection between said second crank arm and the rockshaft of said central frame section and a disengaged position permitting movement of said rockshafts without imparting movement to said second crank arm.

References Cited by the Examiner
UNITED STATES PATENTS

| | | | |
|---|---|---|---|
| 2,687,073 | 8/1954 | Thorp | 172—456 X |
| 3,021,908 | 2/1962 | Dlugosch | 172—466 |
| 3,072,201 | 1/1963 | Brakhage | 172—456 |
| 3,173,497 | 3/1965 | French | 172—456 |

ANTONIO F. GUIDA, *Acting Primary Examiner.*

WILLIAM A. SMITH III, *Examiner.*